Nov. 14, 1961 W. J. CAMP 3,009,020
DIGIT ABSORBING CONVERTER FOR TELEPHONE SWITCHBOARDS
Filed March 14, 1955
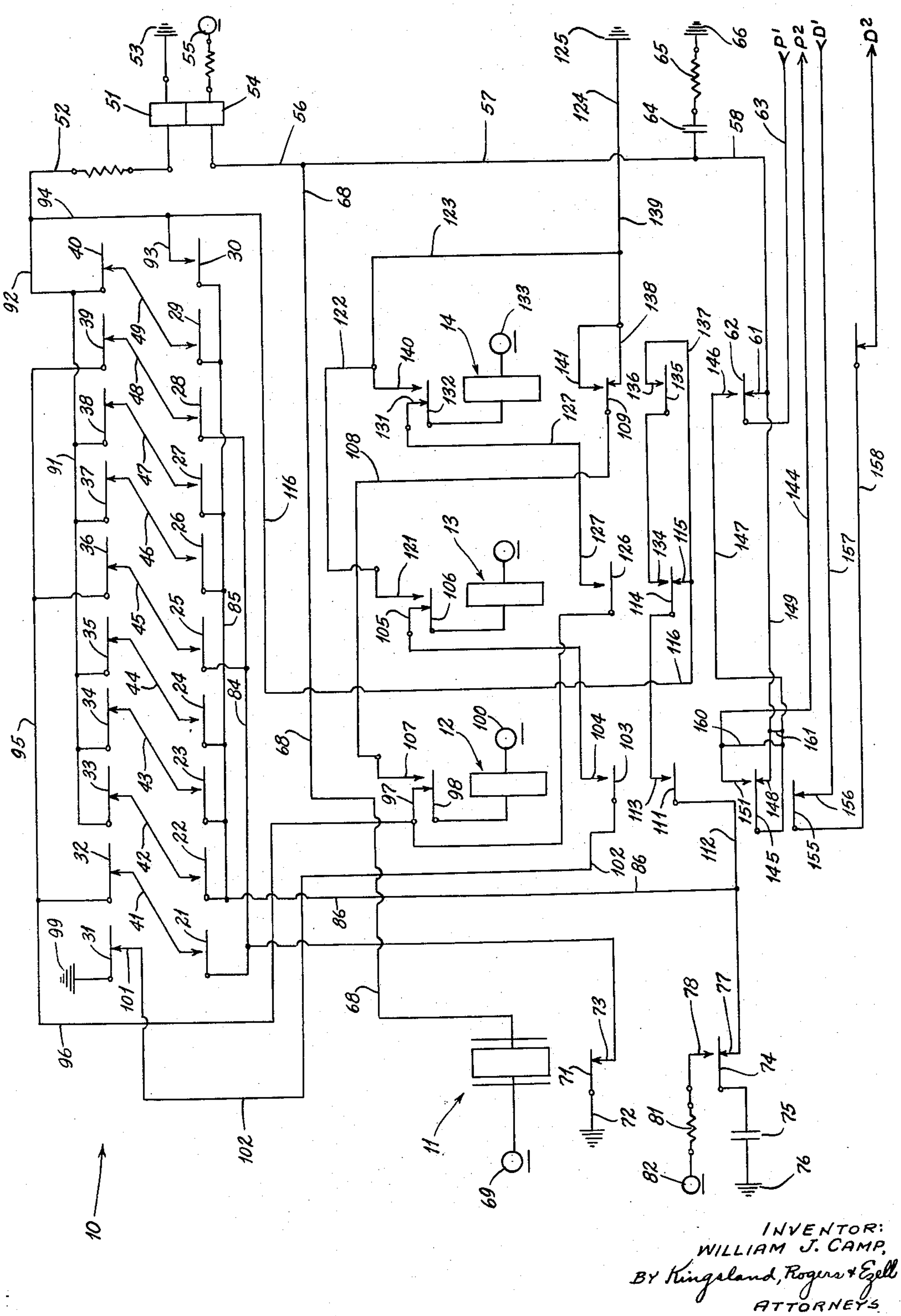
INVENTOR:
WILLIAM J. CAMP,
BY Kingsland, Rogers & Ezell
ATTORNEYS 3,009,020

DIGIT ABSORBING CONVERTER FOR TELEPHONE SWITCHBOARDS

William J. Camp, Dallas, Tex.
(1611 Wells Ave., Northfield, N.J.)

Filed Mar. 14, 1955, Ser. No. 493,977
9 Claims. (Cl. 179—16)

This invention relates to improvements in signaling apparatus, and in particular is concerned with a converter for absorbing excess digits in a dial telephone system.

In recent times, the various telephone organizations of the Bell Telephone operating group have changed their dialing systems to the two-five numbering plan. In this numbering plan, the two refers to the exchange, i.e., PR, and the five refers to five digits, as 8–3479, for a number corresponding to PR–8–3479. In independent exchanges located away from the major metropolitan areas, the station or office code is not needed for local subscriber dialing. Thus, for example, in the number PR–8–3479, the dial pulls for PR are, on the standard dial, 7–7, and must be absorbed because the local switchboards are not designed for two-five local numbering.

By means of this invention, the demands of the independent telephone industry are met, which allows present switchboards to absorb any combination of digits or dial pulls not required in the normal local dialing of subscribers, and at the same time conformance to the numbering plans and policies of the Bell Telephone operating group is met. The converter of this invention is designed to absorb and cut through on any combination of dial pulls regardless of numerical repetition or assignment of exchange codes. This converter offers dial protection for exchanges where the full directory listing would give the two-five numbering plan and people not familiar with local telephone service would normally dial this complete directory listing in which for the local situation only the last five digits, as 8–3479 in the number PR–8–3479, are required to reach the called number.

The term "dial protection," as used herein, means that the calling subscriber or operator is offered protection from dialing the incorrect number into the switching equipment should the calling dial pulse the full seven digits where only five digits are necessary to switch the call in a particular office. Consider a dial office located in the end position of a toll connection where only four digits are required for local operation of the necessary switching to complete a call. In this office the switching equipment will operate corresponding to the last four digits in connecting the calling and called number into a talking path.

When such an office is placed in the National Numbering Plan promulgated by the Bell System, it will be assigned the standard two-five numbering which will consist of two letters and five digits or numbers, but the local switching equipment can only use the last four digits for switching purposes as it was originally designed to do.

With the new numbering plan in effect and the local directory published in a standard form, the toll path into that office from the toll network is reached by the first three dial pulls or the AB-X digits of the office code. Where a local subscriber dials the full listed directory number (two letters and five digits) and the digit absorber absorbs the first three digits and then cuts into the switching equipment for the remaining dial pulls, the calling subscriber has full dial protection. In a like manner, should the switching equipment not be equipped for the full seven digit dialing and only for absorbing the "X" or fifth from the last digit, the equipment is not offering full dial protection to the calling station.

A large number of independent telephone offices in dial operation, for dial economy and ease in dialing local calls, require the local subscribers to dial only five digits of the full two-five plan, but should a transient caller not being familiar with the dial procedure dial the full seven digits, he will through this invention have full dial protection on his call.

Through the provision of an impulse counter and a sequential arrangement of relays, the converter of this invention can be incorporated in the standard independent switchboard through the provision of a minimum of lead changes. The apparatus of this invention functions by absorbing the pulses from the unnecessary dial pulls by not permitting them to enter the switchboard, so that the digits represented by these unnecessary dial pulls are absorbed. Thus, the number dialed through the function of this apparatus will reach the switchboard with only the digits through the required dial pulls as the others are absorbed.

The converter of this invention is incorporated into any conventional switchboard in a very simple manner by connecting the apparatus of this invention into the pulse and dial tone leads. Since the converter apparatus can be rack mounted, it will be apparent that it can be very simply installed and maintained.

Accordingly, it is a primary object of this invention to provide a digit absorbing converter for a selected number of digits in a signaling apparatus.

Another object of this invention is to provide a digit absorbing converter for a dial switchboard which can absorb a variable number of preselected digits.

Yet another object of this invention is to provide a digit absorbing converter for use with local exchanges having dial systems using less than seven digits and into which seven digits from the two-five telephone numbering system are dialed.

A further object of this invention is to provide a digit absorbing converter comprising an impulse counter and a series of relays which can be easily installed in a standard exchange.

Still another object of this invention is to provide a digit absorbing converter made up from standard components of rugged construction and simple design in which there are no complicated parts which require extensive racing or critical split-second timing in the functioning of movable physical components for satisfactory operation.

Still a further object of this invention is to provide a digit converting apparatus which can be made in package form and assembled into a standard switchboard by relatively unskilled workmen in a simple and easy manner.

Still further objects of this invention will appear in the detailed description which follows and will be further apparent to those skilled in the art.

For the purpose of illustration, there is shown in the accompanying drawing a preferred embodiment of this invention. It is to be understood that this drawing is for the purpose of example only, however, and that the invention is not limited thereto.

The single figure of the drawing shows in schematic form the electrical connections for the magnetic impulse counter and the relays which are adapted to be connected into the pulse leads $P^1$ and $P^2$ and dial tone leads $D^1$ and $D^2$ in a conventional switchboard.

The digit absorber converter of this invention includes a magnetic impulse counter generally indicated at 10 connected to a number of relays. These relays are series relay 11, cut-through relay 12, relay 13 and relay 14.

The impulse counter 10 may be of the type made under the designation "Magnetic Impulse Counter" by Kellogg Switchboard and Supply Company which provides for the counting of ten separate impulses. This counter includes a lower set of ten springs number from 21 through 30 and an upper set of ten springs numbered from 31 to 40. A set of nine spring contacts numbered from 41 to 49 extend in staggered relationship from each lower normally open spring to the next adjacent upper normally closed spring. The upper springs of the impulse counter are adapted to be connected as will be more particularly described below to a knock-down coil 51 through a lead 52, the other side of the knock-down coil being grounded at 53. A pulse coil 54 connected to battery 55 leads through the lead 56, leads 57 and 58 to a normally made contact 61 with the spring 62 of the relay 14. The spring 62 is then connected through the lead 63 to the pulse lead from the switchboard in which this converted apparatus is utilized.

Between leads 57 and 58 is connected a condenser 64 which is grounded through a resistor 65 at ground 66. Between the leads 56 and 57 there is a lead 68 which connects to the series relay 11, the other side of which is connected to a negative battery source 69.

A spring 71 for the relay 11 is grounded at 72 and is normally made with a contact 73. This series relay 11 is of the hold type or slow release so that it holds during all of the dial pulses for each dial pull, as will be more fully understood below.

Another spring 74 of the relay 11 is connected through a condenser 75 to ground 76. This spring is normally made with contact 77. A normally open contact 78 leads through a resistance 81 to a negative battery source 82.

The contact 73 leads to a strap 84 which is connected in multiple to lower make-springs 21, 25 and 28 of the impulse counter 10 or any assigned digits required. The remaining lower springs 22, 23, 24, 26, 27, 29 and 30 are connected to a strap 85 which is connected by the lead 86 to the contact 77 associated with the spring 74 of the relay 11.

The impulse counter also has a top strap 91 connected in multiple to the upper springs 33, 34, 35, 37, 38 and 40 or any assigned digits required of the impulse counter, and this strap is connected to the knock-down lead 52 through a lead 92. A normally open contact 93 above the lower spring 30 of the impulse counter is likewise connected to 52 through a lead 94.

The remaining upper springs are connected to a spring of the cut-through relay 12. Thus, the upper springs 32, 36 and 39 or any assigned digits required are multipled to a strap 95 connected to a lead 96 fastened to a normally made contact 97 with spring 98 of relay 12. The upper spring 31, which is the first upper spring of the impulse counter, is grounded at 99. Its normally made contact is designated at 101 and is electrically connected to the lead 102 terminating in the relay 12 on the spring 103. A normally open contact 104 leads to a normally made contact 105 with the spring 106 of relay 13.

Returning to the spring 98 on the relay 12, there is a make-before-break contact 107 connected to the lead 108 terminating at spring 109 of the relay 14. A lower spring 111 of relay 12 is connected to the junction of leads 77 and 86 through lead 112. The normally open spring 111 is associated with a contact 113 leading to a spring 114 of the relay 13 normally made with the contact 115. This normally made contact 115 is fastened to the lead 116 terminating in the junction of lead 94 and contact 93 in the impulse counter which leads to the knock-down coil eventually at 51 and to ground at 53.

Another make-before-break contact 121 for the relay 13 is associated with the spring 106 and is connected to lead 122 and leads 123 and 124 to a hold in the selector ground 125. A lower spring 126 is normally broken with a contact 127 in the relay 13, which contact leads to a normally made contact 131 of the spring 132 with relay 14, the other side of the spring being connected through the relay to the battery at 133. A normally open contact 134 is associated with spring 114 of relay 13 which is electrically connected to spring 135 of relay 14. A normally broken contact 136 of this spring then is connected to the lead 116 through a lead 137 and back through the knock-down coil.

Returning to the spring 109 of the relay 14, there is a normally made contact 138 connecting with lead 139 and lead 124 to the hold-in selector ground 125. A normally open contact 141 is likewise associated with the spring 109 and is also connected to ground 125.

All of the above described apparatus is designed for the proper control in absorbing and cutting through of the pulses from the dial. The passing of the dial pulses from pulse lead 63 is made possible through a controlled relay actuation to return pulse lead 144 by the proper operation of the spring 62 associated with the relay 14 and spring 145 associated with the cut-through relay 12. In this circuit associated with the spring 62, there is a normally open contact 146 which is connected to the lead 147 to the spring 145. A normally made contact 148 connects with the lead 149 leading back to the junction of the contact 61 and lead 58. A normally open contact 151 is associated with the spring 145 and this connects with the lead 144 returning the dial pulse back to the switchboard.

A strap 160 between leads 144 and 147 and a strap 161 between leads 149 and 147 are for a purpose to appear in connection with the wiring of the apparatus as being for two and one, respectively, digit cut-through combinations. No such straps are required for three digit cut-through. For the two digit cut-through of this example, however, the strap 160 is connected and strap 161 is removed. In order that the dial tone may be interrupted by the cut-through relay 12, there is provided a spring 155 associated with this relay and a normally made contact 156 leading to dial tone lead 157. The spring 155 is connected to the other dial tone lead 158 and these leads are then connected to the switchboard in the usual manner. The operation of the converter to the magnetic impulse counter and the relays used is simple and requires no racing for time or critical sequential operations through complicated sensitive relays or relay control points. The converter operation is made possible by merely connecting the pulse leads 63 and 144 into the switchboard pulse lead and, as a result, until the proper digits are dialed, the converter will absorb and throw out any unwanted dial pulls that are not required in the switching of calls in the switchboard. As shown in this circuit, numbers 1, 5 and 8 are the preselected numbers connected by the strapping arrangement which cuts through the digit absorbing mechanism and permits the pulsing required to signal the subscriber. However, as will be apparent, these numbers can be changed by altering the strapping arrangement.

*Operation*

The pulsing enters the converter through the lead 63 and, as this lead is connected to the same pulse source that does the normal pulsing of the switching equipment in normal operation, it will also pulse the converter for its operation and cut-through. Pulsing current passes from lead 63 through the spring 62 of relay 14, contact 61, leads 58, 57 and 56, and into the pulse winding 54 of the impulse counter 10 and to negative battery 55. This pulse also appears in the winding of the series relay 11 through the lead 68 to energize the same from the battery source 69.

The impulse counter reproduces or records the number of pulses in the dial offered to the winding of the coil 54, and as it pulses the upper and lower springs in the impulse counter operate depending upon the number of pulses in the dial pull. Thus, if the dialed digit is one, the dial pulses one time and the counter will count up to one by closing the spring 21 and opening the upper spring 101. If the digit is five, the dial pulses five and the counter will close all of the lower springs 21 through 25 and open all of the upper springs 31 through 35. Thus, an exact recording of the number of pulses offered to the counter in each dial pull is recorded. Therefore, in this invention the impulse counter is used to record the calling dial pulses and absorption of all unwanted digits not required to switch the switching equipment within the switchboard regardless of numerical order or repetition of digits may be made.

The series relay 11 operates upon the first dial pulse of the dial pull and holds over for all subsequent dial pulses from the same dial pull, since it is a slow release relay. Thus, this relay is energized for all three pulses for the dialed digit three, for example, and for all ten pulses for the dialed digit zero. This relay, since it remains operated during the entire pulsing of the dial pull, is used to control the other relays after the dial has stopped sending pulses into the converter and after the impulse counter has had time to record the incoming dial pulses.

The remaining relays 12, 13 and 14 are cut-through relays but are operated upon preselected digits chosen by the above-described strapping on the impulse counter for the upper and lower springs. The operation of the converter in this example is the cut-through on a simple combination of any two digits from the group 1, 5 and 8. These digits may be in any order or repetition and operate the same regardless of their combination. As shown in the drawing, with the strap 160 between the leads 147 and 144 in place, the converter is cut through on a combination of the above named digits 1, 5 or 8. As an example, we can assume the calling subscriber dials a number SU–8–2469 in which the first three dial pulls will be for seven, eight and eight dial pulses, respectively. The converter equipment is wired to absorb the code and all pulsing is done within the converter with these three pulls, and not within the switching equipment of the switchboard.

The first dial pull in this example for the number SU–8–2469 causes seven pulses of ground to appear on lead 63 from the switchboard equipment. This ground connects a path through the lead 63, spring 62, contact 61, leads 58, 57 and 56, respectively, through the coil 54 to the negative battery 55, as well as through the lead 68 to relay 11 to negative battery 69. Then in this operation the impulse counter is operated to the point where all the lower springs 21 through 27 are made while the upper springs 31 to 37 are broken. Simultaneously, the series relay 11 is operated all during the pulsing and operation of the impulse counter for the seven incoming pulses. Because this relay is a slow release type, it remains over during the pulsing of the dial and is saturated sufficiently to hold its springs in the operated position and thus offer the converter sufficient time to count the operations of each dial pulse of each dial pull.

Since in this operation the digit 7 is to be absorbed, the impulse counter operates in the following manner. As soon as the pulses from the dialed digit 7 cease, the counter makes a closed path between the lower spring 27 of the impulse counter and the upper spring 38 which closes a knock-down circuit. This knock-down circuit through the closed spring contact extends on one side through the strap 91, leads 92 and 52, through the knock-down coil 51 to the ground 53. The other side of the spring contact 47 leads from spring 27 to the strap 85, lead 86 and spring 77, to the spring 74 of the series relay 11 which, at the start of the operation, is open.

However, at this point the function of the spring 74 in relay 11 should be set forth. During the operation of the series relay through the seven pulses, the ground 76 is removed from the spring 74 and lead 77. Instead, the spring is connected from the ground 76 and condenser 75 to upper contact 78 to the negative battery 82 which charges the condenser. When the dial pulse is completed, the relay 11 is deenergized, and the spring 74 returns to its normally made contact 77. In so doing, the charged condenser 75 discharges up through contact 77, lead 86 through strap 85 and the contact spring 27 back to the knockdown coil 51. This reverses the coil flux to the operated springs and returns them to their normal non-operated position.

In this manner, any combination of digits may be absorbed by the strap arrangement on the impulse counter springs. As shown, the absorbed numbers are 2, 3, 4, 6, 7, 9 and 0. Any time the counter counts up to a spring that is arranged for absorbing, it will knock the counter down at the end of the dial pull and the completion of the dial pulse and set the equipment up for the next dial pull. Thus, in the example shown, for the first dial pull for the letter S or the number 7, which are one and the same on the standard dial face, the seven pulses were absorbed within the converter, and the converter after the dial pull operation was reset to await the next dial pull or dial pulses from the calling station.

From the above description for the absorbed digits through the description of the strap arrangement 85 and 91, it will be obvious that for any combinations or permutations of the absorbed numbers the operation will be the same over and over again.

Continuing with the second dial pull for the number SU–8–2469, the second digit dialed is U, or as it appears on the telephone dial, the number 8. For this digit, the operation of the impulse counter and the series relay is the same up until the time the lower spring 28 or the impulse counter is closed by the pulse coil 54. The operation of the lower spring 28 makes a contact with the spring contact 48 to the normally closed upper spring 39. Clearly, it will be noted that the upper spring is not connected to the strap 91 to the knock-down lead, but is connected to the strap 95. This strap is connected to lead 96 and the normally made contact 97 associated with the spring 98 of the relay 12, and the path of current from the spring is through the relay coil and to the negative battery 100.

Returning to the spring contact 48 of the counter, which is in engagement with the operated lower spring 28, it will be seen that this lower spring is connected to the strap 84. This strap 84 is in electrical contact with the contact 73 associated with the relay 11. At the completion of the dial pull, the series relay 11 returns to its normal non-operated position so that the spring 71 again makes contact with the contact 73 to place the ground 72 thereon. This gives a path of current as above described up through the impulse counter through the spring contact 48 and from there to the strap 95 through the contact 97, the spring 98 to energize the coil of the relay 12. Thus, for the dialing of digit 8, it can be seen that, instead of a knock-down at this point and absorption of the digit, as was the case for the first digit 7, the digit 8 operates relay 12 to set up the first step in the chain of unlocking the converter.

When relay 12 is operated, it closes a knock-down circuit to the coil 51 of the impulse counter in the following manner. On the release of the series relay 11, the negative battery 82, which previously had charged the condenser 75 through the operation of the spring 74 against the contact 78, is released. Thus, the charged condenser 75 grounded at 76 presents a path through the spring 74 and contact 77, through the now operated spring 111 of the relay 12, through the spring 114 made with the contact 115 for the relay 13, through leads 116, 94 and 52 to the coil 51. Thus, the knock-down winding 51 is energized only on the operation of the relay 12, and there is no critical race for time in the operation of the components of the converter. As the knock-down winding is energized, the impulse counter will be restored to normal for operation on the next dial pull.

To compare the operation of the absorbed digit, it can be seen that for the digit 7 the knock-down was through the charged condenser 75 through the strapping 85 of the converter and leads 92 and 52 to the coil 51. For the preselected digit 8, and the case would be the same for digits 1 and 5, a different path around the impulse counter is presented which is completed only when the relay 12 is operated, as has been above described.

Continuing with the operation of the components after the digit 8 has been dialed for the second dial pull, it will be seen that the relay 12 is held in its operated position by the making of spring 98 with the contact 107, which is a make-before-break sequential operation. This puts the ground 125 on the coil through the leads 124, 139, contact 138 and spring 109 of the relay 14, and then through the lead 108. In this operation, the relay coil will be held in the locked position even after the impulse counter is knocked down.

The next relay, i.e., relay 13, is operated by the closing of the spring 103 of the relay 12 against the contact 104, which puts the ground 99 thereon. Thus, a path is presented to contact 105 and spring 106 of relay 13 to the battery associated with this coil and ground at contact 101 of the counter when the counter is knocked down.

Relay 12 also operates to remove its spring 155 from contact 156 so as to open dial tone leads 157 and 158. This dial tone lead is a mere loop from the switching equipment to the calling party's head set and is opened to kill the dial tone.

The spring 145 of the relay 12 is also removed from the contact 148 and made with the contact 151, but this operation will be further explained in connection with the relay 14. The relay 14 has its spring 62 so associated with the spring 145 of the relay 12 so as to complete the pulsing circuit into the switchboard when the relay 14 is operated, as will further appear hereinbelow.

As previously mentioned above, the relay 13 is operated by the movement of the spring 103 in the relay 12 into contact with contact 104. This energization of the relay 13 takes place from ground 99 simultaneously with the knock-down of the impulse counter.

Now that the eight pulses from the second letter U of the number SU–8–2469 have been dialed, the converter is ready to be unlocked on the third or last pull of the code. The dialing of the digit 8 for this telephone number will return the pulsing lead within the switching equipment for normal dialing of the switchboard equipment. The dialing of the letters SU corresponds to the numbers 7–8 on the telephone dial, and the third dial pull is again the digit 8.

As in the case just mentioned above for the dialing of the letter U in which 8 pulses are presented, there is a path presented in the impulse counter through the spring contact 48 to the upper spring 39 and the strap 95. This path then leads through the lead 96 to the contact 97 which is now open on relay 12, and then to spring 126 operated against the contact 127 for the relay 13. This spring, as mentioned above, has operated when the knock-down action took place within the counter. From the springs 126 and 127, there is a path leading to the normally made contact 131 associated with the spring 132 of the relay 14 and then to the battery 133 which is designed to operate this relay. Returning now to the impulse counter, it will be seen that a ground is presented through the lower spring 28 and the strap 84 leading to the contact 73 of the spring 71, which is made against the ground when the relay 11 releases upon the completion of the dial pull. This completes the circuit for operating the relay 14.

The relay 14 also has a make-before-break combination associated with the spring 132. The ground 125, after the spring is operated against contact 140, is connected to leads 123 and 124. Also, in the operation of the relay 14, a knock-down path is presented to the coil 51 through the operation of its spring 135 against the contact 136. In this operation, the charged condenser 75, which is charged at the completion of the operation of the series relay 11 as previously described, discharges through the released spring 74 of the relay 11, through contact 77, operated spring 111 and contact 113 of relay 12, and from there to the spring 114 held against contact 134 of the relay 13. Thus, the relay 14 also completes a circuit through the lead 137 and lead 116 to leads 94 and 52 to the knock-down coil 51. Therefore, it can be seen that this relay 14 must operate in order to knock the counter down, and the counter cannot be knocked down from any preceding relay in this dial pull since the knock-down path is transferred to each succeeding relay when the preceding relay has performed its function. This assures a foolproof operation and obviates any race between actions of various relays within the equipment.

In this example for the number SU–8–2469, the operation is completed on dialing the second 8 of the code, i.e., upon the completion of the dialing of SU–8. At this point, the pulse lead is cut back in the switching equipment for the normal dialing operation of the called station. Thus, the operation of the relay 14 has moved the spring 62 against the contact 146 through the lead 147, through strap 160 on relay 12 and back out through the lead 144 to switch the pulse lead back into the switchboard for this two-digit cut-through. The strap 160 on the relay 12 must be in place for two-digit cut-through. Relay 12 is released by the operation of relay 14 and the breaking of ground at points 136 and 109 of relay 14. Thus, contact 141 would not be required for two-digit cut-through. The converter apparatus is released upon the completion of the call through an interruption of the ground 125 by normal switchboard operation (not shown).

The circuit shown above presents full adaptability for the cut-through for one, two or three digits of the one, five and eight preselected numbers for strapping described. If a combination of three digits are required before cut-through is provided, these digits can be absorbed in the following manner for the number TU–8–2469 for example. In this operation, it must be remembered that the relay 14, when it operated, removed the spring 109 from the contact 136 and made a contact with contact 141 which momentarily interrupted the ground 125 from contact 107 associated with the spring 98 of relay 12. This allowed relay 12 to drop out or return to its normal non-operated position. When this happened, the pulse lead from lead 63 was transferred from the spring 62 and contact 146 back into lead 147 through strap 160. For three-digit cut-through, the relay 12 would have to be operated for the second time on the third code digit as follows: When relay 14 operated on the U, or second eight, of the prefix TU, it allowed relay 12 to release from the hold ground on lead 139 at contacts 136 and 109 of relay 14. The third eight would again operate relay 12, as previously described, and by removing strap 160 the cut-through action would be on the third dial pull or the third code digit, i.e., the 8 of TU–8–2469. It is seen that to cut through on two digits relay 14 would perform this function by closing the spring 62 onto 146 through lead 147, through strap 160, back out lead 144.

For three code digit cut-through, as relay 12 has been released on the dialing of the second code digit, it is necessary to operate relay 12 again so the strap 160 is removed. The cut-through then is completed with the closing of the spring 145 onto 151 and lead 144 upon the dialing of the third code digit.

For one digit coding such as in the number PR–5–2469, a strap 161 may be used between leads 147 and 149. This strap bypasses the spring 62 of relay 14 so that the converter is fully unlocked on the dialing of only the one code digit. With this strapping, and on the operation of relay 12 on the last pulse of the digit 5, there will be a pulse lead path from pulse lead 63 through spring 62 and contact 61 of unoperated relay 14, lead 149, strap 161, lead 147, spring 145 and contact 151 of the operated relay 12, to lead 144 for the return of the pulsing to the switchboard.

Thus, this converter is designed to convert on any combination of digits regardless of numerical order or repetition. The most simple form is no repetition of the code digit within the code letters for the numbers such as PRospect 5–2469, the next step being two code numbers the same as explained for the number SU–8–2469, and the ultimate being three numbers as for TU–8–2469 by using the relay 12 for the second time to transfer the pulse lead back into the equipment.

This invention has been particularly described in connection with dial switchboards. It is, however, to be understood that the pulse signaling apparatus of this invention is not limited to telephone circuits, but can be employed wherever signaling circuits require some digit absorption. Various changes and modifications may be made in the invention as will be apparent to those skilled in the art. Such changes and modifications are within the scope of this invention as defined by the claims appended hereto.

What is claimed is:

1. A digit absorbing converter apparatus for use with dial telephone switchboards, said converter being adapted to be connected into a dial pulse lead for absorbing excess digits and passing the desired digits, said converter having pulse absorption means for absorbing pulses from all digits except at least one preselected digit having a number of pulses corresponding to the numerical or alphabetical order of said digit, means responsive to the pulses from said preselected digit for unlocking the converter to pass later dialed digits through the pulse lead back into pulsing equipment of the switchboard, said absorbing means comprising an impulse counter having magnet spring contact means for making a separate path for digits one to ten and a knock-down coil for deenergizing the magnetic spring contact means, and multiple means for connecting each path corresponding to the digits to be absorbed, said multiple means being connected to the knock-down coil in the impulse counter, and means to energize the coil after the pulses corresponding to the digit to be absorbed have all been sent through the impulse counter and before succeeding dial pulses have been received, said energizing means comprising a relay which is adapted to complete a circuit through said knock-down coil after the completion of the dial pulsing for each dial pull.

2. A digit absorbing converter apparatus for use with dial telephone switchboards, said converter being adapted to be connected into a dial pulse lead for absorbing excess digits and passing the desired digits, said converter having pulse absorption means for absorbing pulses from all digits except at least one preselected digit having a number of pulses corresponding to the numerical or alphabetical order of said digit, means responsive to the pulses from said preselected digit for unlocking the converter to pass later dialed digits through the pulse lead back into pulsing equipment of the switchboard, said absorbing means comprising an impulse counter having magnet spring contact means for making a separate path for digits one to ten and a knock-down coil for deenergizing the magnetic spring contact means, and multiple means for connecting each path corresp^nding to the digits to be absorbed, said multiple means being connected to the knock-down coil in the impulse counter, and means to energize the coil after the pulses corresponding to the digit to be absorbed have all been sent through the impulse counter and before succeeding dial pulses have been received, said unlocking means comprising at least one separate path through the impulse counter for the preselected digit to a cut-through means, said cut-through means being thereby adapted to close a switch in the pulse lead upon the dialing of said preselected digit.

3. A digit absorbing converter apparatus for use with dial telephone switchboards, said converter being adapted to be connected into a dial pulse lead for absorbing excess digits and passing the desired digits, said converter having pulse absorption means for absorbing pulses from all digits except at least one preselected digit having a number of pulses corresponding to the numerical or alphabetical order of said digit, means responsive to the pulses from said preselected digit for unlocking the converter to pass later dialed digits through the pulse lead back into pulsing equipment of the switchboard, said absorbing means comprising an impulse counter having magnet spring contact means for making a separate path for digits one to ten and a knock-down coil for deenergizing the magnetic spring contact means, and multiple means for connecting each path corresponding to the digits to be absorbed, said multiple means being connected to the knock-down coil in the impulse counter, and means to energize the coil after the pulses corresponding to the digit to be absorbed have all been sent through the impulse counter and before succeeding dial pulses have been received, said unlocking means comprising at least one separate path through the impulse counter for the preselected digit to a cut-through means, said cut-through means comprising a cut-through relay having an armature which closes a contact in the pulse lead upon the dialing of said preselected digit.

4. A digit absorbing converter apparatus for use with dial telephone switchboards, said converter being adapted to be connected into a dial pulse lead for absorbing excess digits and passing the desired digits, said converter having pulse absorption means for absorbing pulses from all digits except at least one preselected digit having a number of pulses corresponding to the numerical or alphabetical order of said digit, means responsive to the pulses from said preselected digit for unlocking the converter to pass later dialed digits through the pulse lead back into pulsing equipment of the switchboard, said unlocking means being responsive to two dial pulls of said preselected digit to close a pulse lead circuit to pass following digits, said absorbing means comprising an impulse counter having magnet spring contact means for making a separate path for digits one to ten and a knock-down coil for deenergizing the magnetic spring contact means, and multiple means for connecting each path corresponding to the digits to be absorbed, said multiple means being connected to the knock-down coil in the impulse counter, and means to energize the coil after the pulses corresponding to the digit to be absorbed have all been sent through the impulse counter and before succeeding dial pulses have been received, and said unlocking means comprising at least one separate path through the impulse counter for the preselected digit to a cut-through means, said cut-through means being thereby adapted to close a switch in the pulse lead upon the dialing of said preselected digit.

5. A digit absorbing converter apparatus for use with dial telephone switchboards, said converter being adapted to be connected into a dial pulse lead for absorbing excess digits and passing the desired digits, said converter having pulse absorption means for absorbing pulses from all digits except at least one preselected digit having a number of pulses corresponding to the numerical or alphabetical order of said digit, means responsive to the pulses from said preselected digit for unlocking the converter to pass later dialed digits through the pulse lead back into pulsing equipment of the switchboard, said unlocking means being responsive to two dial pulls of said preselected digit to close a pulse lead circuit to pass following digits, said absorbing means comprising an impulse counter having magnet spring contact means for making a separate path for digits one to ten and a knock-down coil for deenergizing the magnetic spring contact means, and multiple means for connecting each path corresponding to the digits to be absorbed, said multiple means being connected to the knock-down coil in the impulse counter, and means to energize the coil after the pulses corresponding to the digit to be absorbed have all been sent through the impulse counter and before succeeding dial pulses have been received, and said unlocking means comprising at least one separate path through the impulse counter for the preselected digit to a cut-through means, said cut-through means comprising a cut-through relay having an armature which closes a first switch in the pulse lead on the first dial pull of said preselected digit and said unlocking means including further relay means adapted to be energized upon the second dial pull of said preselected digit to close a second switch in the pulse lead to complete the pulse lead circuit for passing later dialed digits.

6. A digit absorbing converter apparatus for use with dial telephone switchboards, said converter being adapted to be connected into a dial pulse lead for absorbing excess digits and passing the desired digits, said converter having pulse absorption means for absorbing pulses from all digits except at least one preselected digit having a number of pulses corresponding to the numerical or alphabetical order of said digit, means responsive to the pulses from said preselected digit for unlocking the converter to pass later dialed digits through the pulse lead back into pulsing equipment of the switchboard, said absorbing means comprising an impulse counter magnet spring having contact means for making a separate path for digits one to ten and a knock-down coil for deenergizing the magnetic spring contact means, and multiple means for connecting each path corresponding to the digits to be absorbed, said multiple means being connected to the knock-down coil in the impulse counter, and means to energize the coil after the pulses corresponding to the digit to be absorbed have all been sent through the impulse counter and before succeeding dial pulses have been received, said unlocking means comprising at least one separate path through the impulse counter for the preselected digit to a cut-through means, said cut-through means comprising a cut-through relay having an armature which closes a contact in the pulse lead upon the dialing of said preselected digit, and a separate knock-down circuit for the impulse counter adapted to be closed by said cut-through relay when it is energized after the completion of the dial pull for said preselected digit.

7. A digit absorbing converter apparatus for use with dial telephone switchboards, said converter being adapted to be connected into a dial pulse lead for absorbing excess digits and passing the desired digits, said converter having pulse absorption means for absorbing pulses from all digits except at least one preselected digit having a number of pulses corresponding to the numerical or alphabetical order of said digit, means responsive to the pulses from said preselected digit for unlocking the converter to pass later dialed digits through the pulse lead back into pulsing equipment of the switchboard, said unlocking means being responsive to two dial pulls of said preselected digit to close a pulse lead circuit to pass following digits, said absorbing means comprising an impulse counter having magnet spring contact means for making a separate path for digits one to ten and a knock-down coil for deenergizing the magnetic spring contact means, and multiple means for connecting each path corresponding to the digits to be absorbed, said multiple means being connected to the knock-down coil in the impulse counter, and means to energize the coil after the pulses corresponding to the digit to be absorbed have all been sent through the impulse counter and before succeeding dial pulses have been received, and said unlocking means comprising at least one separate path through the impulse counter for the preselected digit to a cut-through means, said cut-through means comprising a cut-through relay having an armature which closes a contact in the pulse lead on the first dial pull of said preselected digit to pass following digits therethrough, and a separate knock-down circuit for the impulse counter adapted to be closed by said cut-through relay when it is energized after the completion of the dial pull for said preselected digit.

8. A digit absorbing converter apparatus for use with dial telephone switchboards, said converter being adapted to be connected into a dial pulse lead for absorbing excess digits and passing the desired digits, said converter having pulse absorption means for absorbing pulses from all digits except at least one preselected digit having a number of pulses corresponding to the numerical or alphabetical order of said digit, means responsive to the pulses from said preselected digit for unlocking the converter to pass later dialed digits through the pulse lead backing into pulsing equipment of the switchboard, said unlocking means being responsive to two dial pulls of said preselected digit to close a pulse lead circuit to pass following digits, said absorbing means comprising an impulse counter having magnet spring contact means for making a separate path for digits one to ten and a knock-down coil for deenergizing the magnetic spring contact means, and multiple means for connecting each path corresponding to the digits to be absorbed, said multiple means being connected to the knock-down coil in the impulse counter, and means to energize the coil after the pulses corresponding to the digit to be absorbed have all been sent through the impulse counter and before succeeding dial pulses have been received, and said unlocking means comprising at least one separate path through the impulse counter for the preselected digit to a cut-through means, said cut-through means comprising a cut-through relay having an armature which closes a first switch in the pulse lead on the first dial pull of said preselected digit and said unlocking means including further relay means adapted to be energized upon the second dial pull of said preselected digit to close a second switch in the pulse lead to complete the pulse lead circuit for passing later dialed digits, and a separate knock-down circuit for the impulse counter adapted to be closed by said cut-through relay when it is energized after the completion of the first dial pull for said preselected digit, and a separate knock-down circuit for the impulse counter adapted to be closed by said relay means when it is energized after the second dial pull for said preselected digit.

9. A digit absorbing converter apparatus for use with dial telephone switchboards, said converter being adapted to be connected into a dial pulse lead for absorbing excess digits and passing the desired digits, said converter having pulse absorption means for absorbing pulses from all digits except at least one preselected digit having a number of pulses corresponding to the numerical or alphabetical order of said digit, means responsive to the pulses from said preselected digit for unlocking the converter to pass later dialed digits through the pulse lead back into pulsing equipment of the switchboard, said unlocking means being fully operable upon three dial pulls of said preselected digit, said absorbing means comprising an impulse counter having magnet spring contact means for making a separate path for digits one to ten and a knock-down coil for deenergizing the magnetic spring contact means, and multiple means for connecting each path corresponding to the digits to be absorbed, said multiple means being connected to the knock-down coil in the impulse counter, and means to energize the coil after the pulses corresponding to the digit to be absorbed have all been sent through the impulse counter and before succeeding dial pulses have been received, and said unlocking means comprising at least one separate path through the impulse counter for the preselected digit to a cut-through means, said cut-through means comprising a cut-through relay having an armature which closes a first switch in the pulse lead on the first dial pull of said preselected digit and said unlocking means including further relay means adapted to be energized upon the second dial pull of said preselected digit to close a second switch in the pulse lead and open said first switch, said cut-through relay then being responsive to a third dial pull of said preselected digit to close the first switch to complete the pulse lead circuit for passing later dialed digits.

References Cited in the file of this patent

UNITED STATES PATENTS

| | | |
|---|---|---|
| 1,805,778 | Mercer | May 19, 1937 |
| 2,211,443 | Stehlik | Aug. 13, 1940 |
| 2,513,400 | Carson et al. | July 4, 1950 |
| 2,691,066 | Fisher | Oct. 5, 1954 |
| 2,695,335 | Jones | Nov. 23, 1954 |
| 2,792,452 | Pharis | May 14, 1957 |